(No Model.)

C. W. MEADOR.
CULTIVATOR AND HORSE HOE.

No. 295,189. Patented Mar. 18, 1884.

Attest:
F. H. Schott
A. R. Brown.

Inventor:
Charles W. Meador

United States Patent Office.

CHARLES W. MEADOR, OF SAN JOSÉ, CALIFORNIA.

CULTIVATOR AND HORSE-HOE.

SPECIFICATION forming part of Letters Patent No. 295,189, dated March 18, 1884.

Application filed March 12, 1883. (No model.)

*To all whom it may concern:*

Be it known that I, CHARLES W. MEADOR, a citizen of the United States, residing at San José, in the county of Santa Clara and State of California, have invented a new and useful Improvement in Cultivators and Horse-Hoes, of which the following is a specification.

My invention relates to improvements in cultivators and horse-hoes having an iron frame, and in which a set of shares operate in conjunction with suitable guide-wheels; and the object of my improvement is to provide for regulating the width and depth of the furrow, to secure an easy method of adjusting the several cutters or shares and greater strength in the cultivator-frame.

The invention consists in the construction and arrangement of parts, as hereinafter more fully described and claimed.

Figure 1:
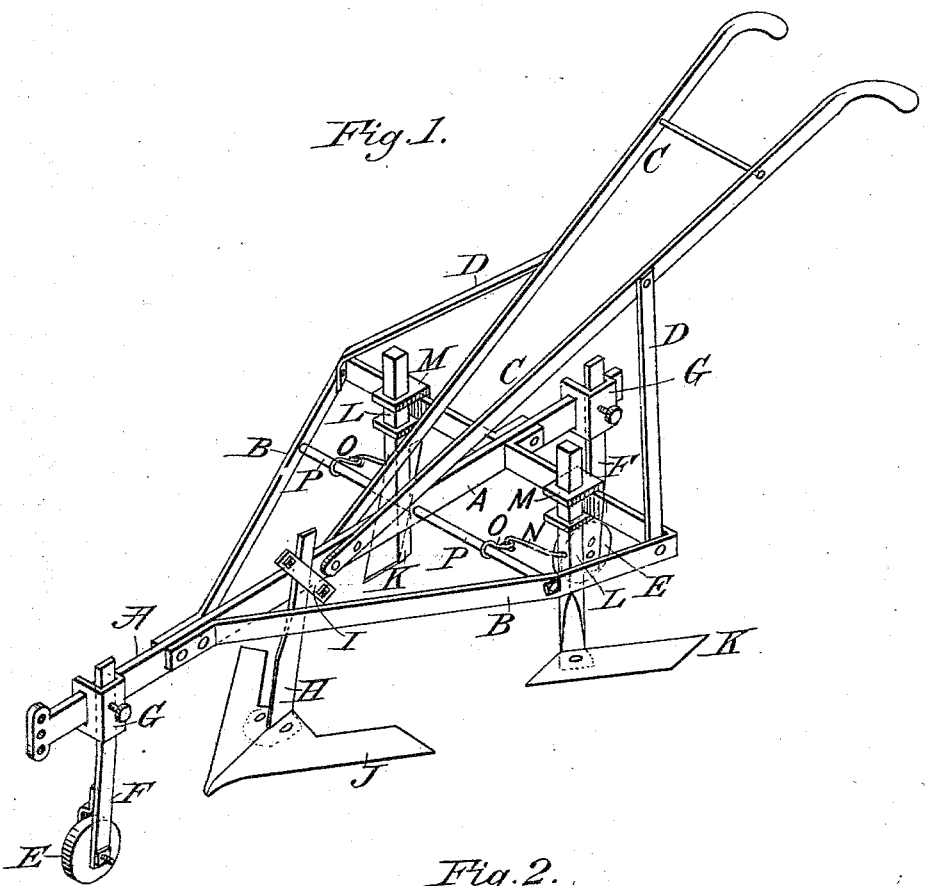
Figure 2:
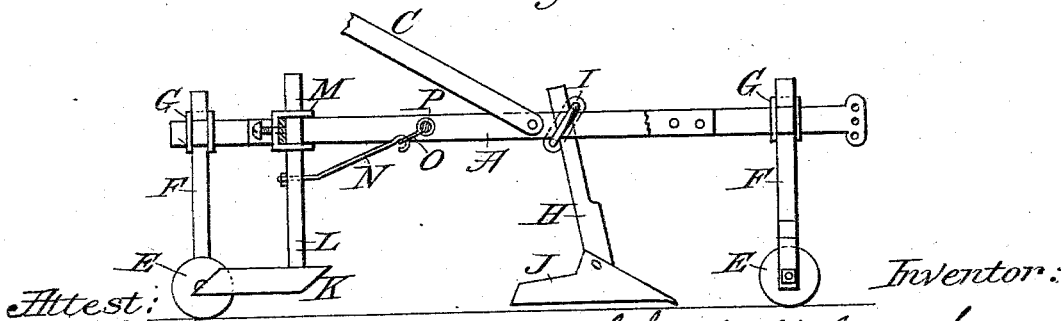

Figure 1 is a perspective view of my improved cultivator, and Fig. 2 is a side elevation of the same.

The frame of the cultivator is preferably made of iron, and consists of the central longitudinal beam or draft-bar, A, to which, on each side, is bolted an angular bar or side piece, B. The handles C C are securely bolted to the beam A, and are connected also to the side pieces, B B, by means of braces D D. To each end of the beam A is connected a guide roller or wheel, E, by means of its shank F, which is adjustably attached to the beam by a clamp, G. A standard, H, is secured to the beam A, near its center, by an adjustable clamp, I, and carries the front share or cutter, J. The rear shares or cutters, K K, are connected by standards L L and adjustable clamps M M to the rear or transverse portions of the angular side pieces, B B, as shown in Fig. 1. The standards L of these rear cutters are braced and steadied by bent rods N, that are bolted thereto, the opposite ends of said rods being hooked and connected by links O O to a transverse rod or bar, P, that connects the central beam and the side pieces.

It will be seen that the guide-rollers are so connected to the beam A as to be readily adjusted back and forth, and raised or lowered as required. The front share or cutter is capable of being adjusted vertically or to any desired angle, and the rear shares or cutters can be adjusted both vertically and laterally.

It may also be remarked that the frame A B constitutes a support of great strength for the attachment of the various parts of the machine, and is of sufficient weight to steady the cultivator and hold the cutters in proper position while at work.

Having thus described my invention, what I claim as new, and desire to secure by Letters Patent, is—

The combination of the beam A, angular side pieces, B B, transverse rod P, the adjustable guide-rollers E E, connected to each end of the beam, the adjustable share or cutter J, carried by said beam, the adjustable shares or cutters K K, carried by the transverse portions of the side pieces, and the rods N N and links O O, for bracing the standards of the rear cutters, substantially as shown and described.

CHARLES W. MEADOR.

Witnesses:
J. E. BROWN,
M. C. CLOSE.